United States Patent

[11] 3,578,914

[72] Inventor Richard A. Simonelli
San Francisco, Calif.
[21] Appl. No. 814,680
[22] Filed Apr. 9, 1969
[45] Patented May 18, 1971
[73] Assignee Lynch Communication Systems, Inc.
San Francisco, Calif.

[54] EQUALIZER WITH AUTOMATIC LINE BUILD-OUT
5 Claims, 7 Drawing Figs.

[52] U.S. Cl. .......... 179/15, 174/16, 333/18
[51] Int. Cl. .......... H04b 3/14
[50] Field of Search .......... 179/16.5; 307/304; 179/15 (APR), 170, 170 (T); 333/18, 28, 28 (A)

[56] References Cited
OTHER REFERENCES
Siliconix Incorporated, "Unifets as Voltage-Controlled Resistors," July 15, 1963

*Primary Examiner*—Kathleen H. Claffy
*Assistant Examiner*—Randall P. Myers
*Attorney*—Mellin, Moore & Weissenberger

ABSTRACT: Automatic line build-out is provided in the equalizer stage of a PCM telephone repeater to correctly and continuously match the repeater automatically to any line length and to varying line parameters. To reduce the power requirements to a minimum, the circuit utilizes the equalized signal itself to determine the amount of degradation and to derive therefrom a control voltage which controls, without power consumption, the amount of series resistance inserted by the line build-out network between the cable and the equalizing circuit. The control is achieved by means of a field-effect transistor passively connected as a variable resistance.

INVENTOR.
RICHARD A. SIMONELLI
BY
McClain, Moore & Weissenberger
ATTORNEYS

Patented May 18, 1971 3,578,914

2 Sheets-Sheet 2

INVENTOR.
RICHARD A. SIMONELLI
BY
Mellin, Moore & Weissenberger
ATTORNEYS

EQUALIZER WITH AUTOMATIC LINE BUILD-OUT

BACKGROUND OF THE INVENTION

In the pulse-code modulation (PCM) mode of telephone transmission, repeaters are customarily positioned in the line at intervals which vary from 1400 to 6000 feet. These repeaters receive the degraded signals from the line and use them to generate fresh signals for transmission over the next section of line. In a conventional twisted-pair telephone cable, degradation of the PCM signal occurs rather rapidly, and there is a very large difference in degradation between a 1400-foot and a 6000-foot line. Since the equalizing circuit of the repeater is designed to process signals with a specific amount of degradation, it is necessary to provide a line build-out (LBO) network between the cable and the equalizing circuit to simulate enough additional line length, whenever the line length between the repeaters is less than the maximum 6000 feet, to make the total degradation equal to that caused by 6000 feet of line. In that way, the equalizing circuit will receive a consistently degraded signal regardless of the line length between the repeaters.

In the prior art, it was necessary to measure the actual line loss between repeaters at the time of installation, and then to select (from a number of stock models) for each individual repeater the LBO network which came closest to complementing the characteristics of the line. Even then, the LBO network was fixed and could not adjust itself to unpredictable variations in the received signal amplitude resulting, e.g. from temperature fluctuations, water saturation of the cable, or variations in the transmitted signal voltage—factors which had to be compensated for by an automatic threshold control (rendered unnecessary in the present invention) in the sampler. In addition, many models of LBO networks were required in the past to accommodate the widely varying loss factors associated with various cable gauges, insulation materials, etc. By contrast, the present invention, when designed, e.g. for use with 22-gauge cable, is compatible with any type of cable in any gauge from 18 to 26.

Finally, prior art devices which attempted to solve the problems of variable loss by the use of automatic gain control circuits created difficulties due to their excessive power consumption. Inasmuch as the repeater power is carried by the cable, any increase in power consumption increases the number of expensive power supply connections to the cable which must be installed for a given length of line.

SUMMARY OF THE INVENTION

In the system of this invention, the series resistance of the LBO network is electronically controlled to automatically simulate whatever line length is necessary to make the total signal degradation at the input to the equalizer circuit correspond to the maximum loss in 6000 feet of the most lossy type of line within the design range of the circuit under the worst anticipated operating conditions.

This result is accomplished by inserting in the LBO network a field-effect transistor (FET) in such a manner that it acts as a variable resistance. The effective resistance of the FET is controlled by a DC control voltage applied to its base.

The equalizer output is fed to a peak detector, whose output is compared to a fixed reference potential in a comparator. The comparator automatically adjusts the DC control voltage fed to the base of the field-effect transistor in the LBO network, in accordance with the difference between the peak detector output and the reference potential, so that the FET-equalizer-peak detector-comparator-FET servo loop is balanced when the equalizer output is at the desired design level.

The total impedance of the LBO network is made such that the shape of the fully degraded output signal is substantially correct, regardless of the series resistance, whenever its amplitude is at the design level for the equalizing circuit input.

It is therefore the object of the invention to provide an automatic line build-out circuit for automatically matching a PCM repeater to a cable regardless of the cable losses.

It is another object of the invention to provide an automatic line build-out circuit whose power consumption is negligibly low.

It is a further object of the invention to accomplish the aforesaid automatic matching through the use of a field-effect transistor connected as a voltage variable resistance, and to derive the DC control voltage for the FET from the equalized signal itself.

DESCRIPTION OF THE PREFERRED EMBODIMENTS

Figure 1:
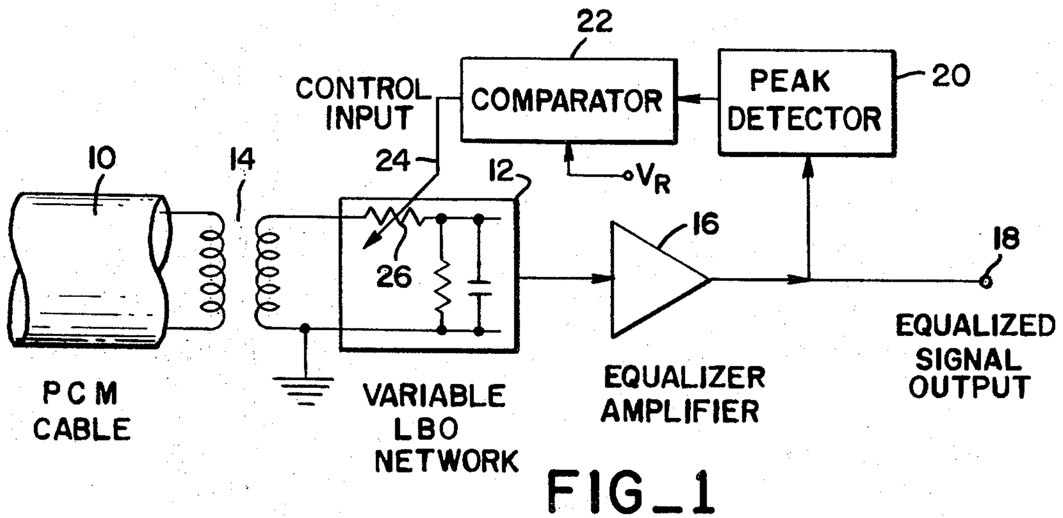
FIG. 1 is a block diagram of the equalizer of this invention.

FIG. 1 shows the device of this invention in block form. A degraded signal is received at the output of a section 10 of PCM cable and is transmitted to the variable LBO network 12 through a coupling transformer 14. The output of the LBO network 12 is processed by an equalizing amplifier 16 to provide an equalized signal at output 18 which is used in other circuitry (not shown) of the repeater to produce a new signal for the input to the next section of the PCM cable.

The output of equalized amplifier 16 is also fed to a peak detector 20 which puts out a DC signal representative of the peak voltage of the equalized pulse signals. This DC signal is compared to a fixed reference voltage $V_R$ in the comparator 22. The result of the comparison determines the DC control input voltage 24 which is used in the variable LBO network 12 to effectively vary the LBO series resistance 26 in a manner hereinafter described.

Figure 3:
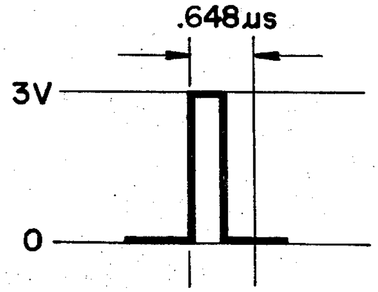
FIG. 3 shows an idealized PCM signal at the input to the line.

An idealized version of the input signal to the PCM cable section 10 is shown in FIG. 3. (In practice, the input signal to the line deviates somewhat from the square shape due to preequalization shaping which gives the signal optimum transmission characteristics.) At the output of PCM cable section 10, the signal of FIG. 3 has been degraded to the shape shown in FIG. 4. It will be noted that since the input signal is a generally square wave of 0.324 microseconds duration contained within a time slot of 0.648 microseconds duration, the degraded signal of FIG. 4 spills to a considerable extent into adjacent time slots. The equalizer is designed to eliminate this spillover.

Figure 4:
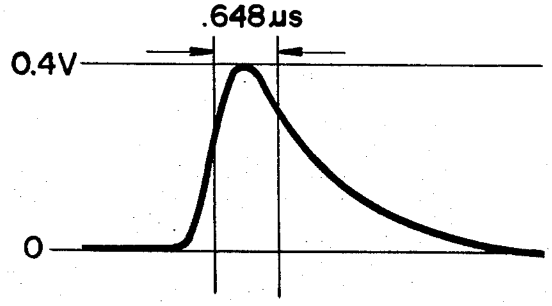
FIG. 4 shows the same signal after it has been degraded by passage through the line.

The signal of FIG. 4 appears at the input 28 of coupling transformer 14 (FIG. 2) and is reproduced in the output 30 of that same transformer. The signal appearing at output 30 is fed to a voltage divider 32, 34 whose center tap 36 is connected to the source-drain circuit of a field-effect transistor 38. The purpose of the voltage divider 32, 34 is to reduce the signal level to a point where the asymmetry and nonlinearity of the FET become negligible.

The characteristics of the FET are not particularly critical, as long as it is of the switching type, i.e. its "on" resistance and pinch-off voltage are low. The main purpose of the FET is to provide a means of varying the characteristics of the LBO network without any power consumption in the LBO network itself.

The base 40 of FET 38 is connected to the variable DC voltage appearing at the output 24 of comparator 22. A resistor 42 may be provided between base 40 and comparator output 24 if desired to increase the impedance of the base circuit, and to thereby decrease its capacity to ground, to provide better symmetry. The source-drain circuit is bridged for improved servo loop stability by stabilizing resistor 46.

The output of the FET at 50 is then fed into a resistance-capacitance network 52, 54 which are so matched to the input impedance of the equalizing circuit as to keep the signal shape within narrow limits over the whole operational range of the LBO.

More specifically, the action of the LBO network described herein involves not only a continuous control of the amplitude (i.e. attenuation) of the incoming signal, but also of the frequency response of the circuit. The basic energy of a single pulse is at 1.544 mc., and the fundamental frequency of a train of pulses of alternating polarity is 0.772 mc. However, the absence of one or more pulses produces correspondingly lower fundamental frequencies. For this reason, it is desirable that the frequency response characteristics of the LBO network be such that for any cable length involved, the rolloff of the cable plus the frequency response characteristics of the LBO network at the control voltage value corresponding to that cable length result in a substantially flat total response curve from very low frequencies to about 3—4 mc.

Figures 5, 6:
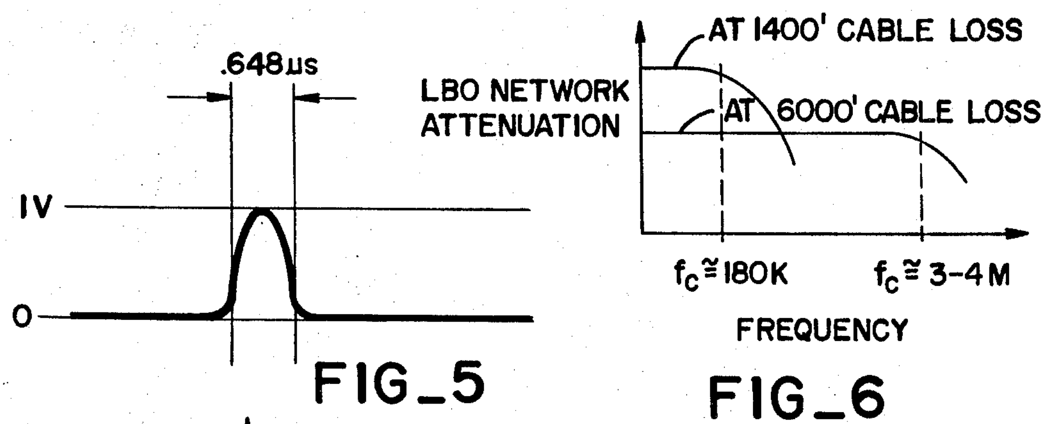
FIG. 5 shows the equalized signal whose peak is used to control the LBO network.
FIG. 6 shows typical attenuation curves of the LBO network at the limits of its range of adjustment.
Figure 2:
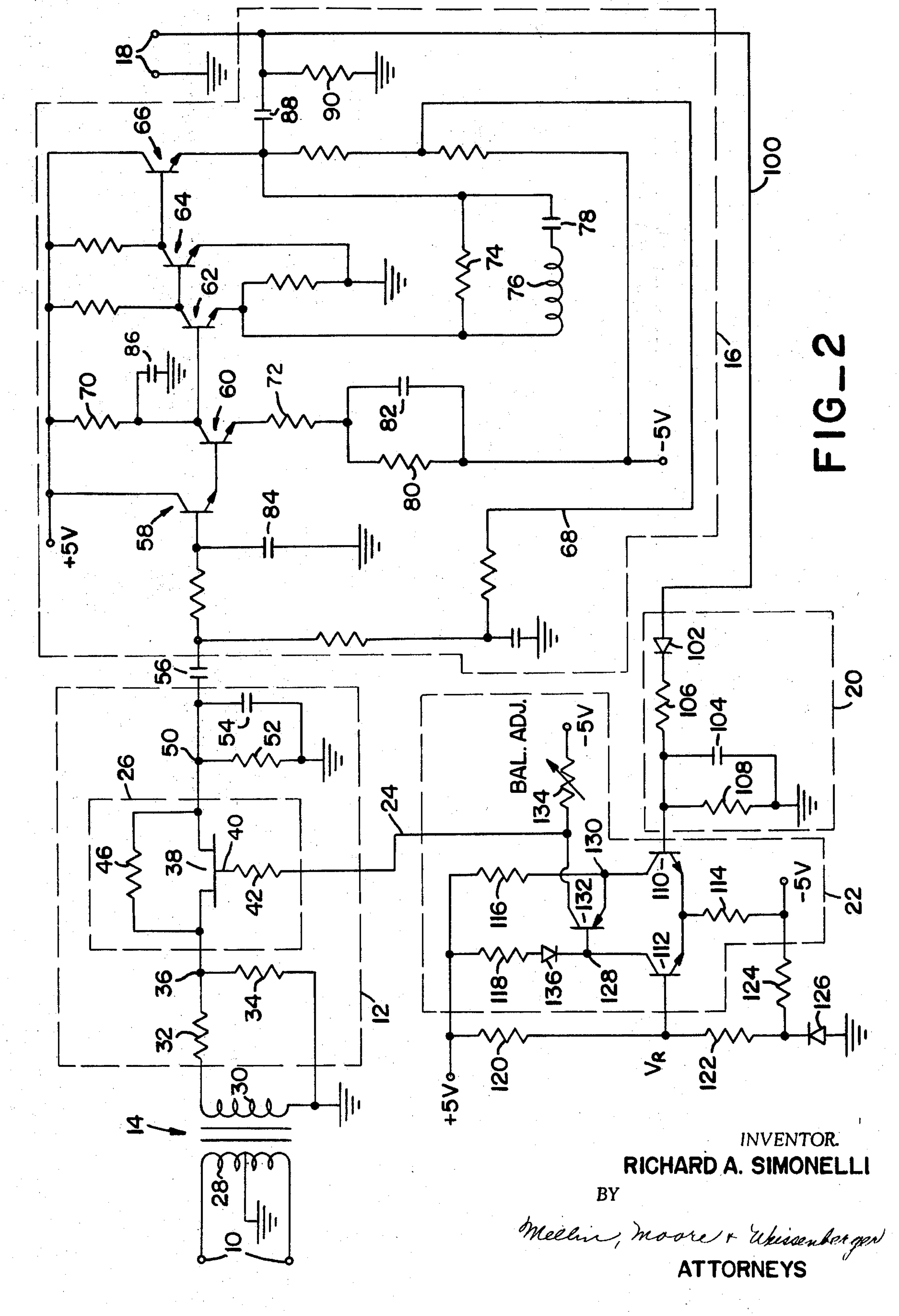
FIG. 2 is a circuit diagram of the LBO network and equalizing circuit.

To accomplish this result, the LBO network shown in FIG. 2 has a frequency characteristic which varies between limits generally as shown in FIG. 6. It will be noted that in the 1400-foot cable build-out condition, the LBO network provides not only substantial attenuation, but also reduces its cutoff frequency $f_c$ to about 80 kc. In the 6000-foot condition, by contrast, the LBO network not only provides very little attenuation, but also raises its cutoff frequency $f_c$ into the megacycle range.

Figure 7:
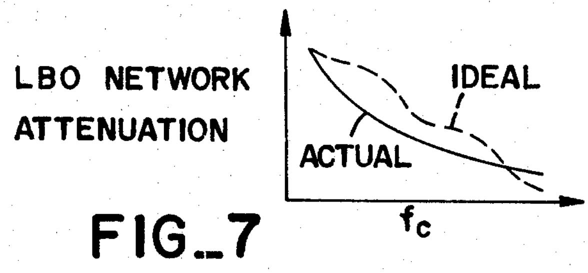
FIG. 7 shows the relationship of the ideal attenuation characteristics of the network as compared to its actual attenuation curve.

It should be understood that the actual frequency response variation of the cable is not only irregular with respect to cable length, but is also affected by the condition of the cable. Hence, the LBO network is so proportioned as to track the ideal frequency response compensation characteristic approximately, within permissible tolerances, as shown in FIG. 7.

Referring back now to FIG. 2, the input signal to the equalizing circuit, which the LBO network has brought to a consistent, predetermined stage of degradation, is coupled to the equalizing circuit through coupling capacitor 56. The equalizer circuit may be of any conventional construction, and is not limited to the particular circuit shown in FIG. 2. The circuit of FIG. 2 does, however, have the advantage of using all NPN transistors, which permits integrated circuit design and provides better temperature characteristics and better matching.

Briefly, in the equalizing circuit shown in FIG. 2, the input stage of the equalizing amplifier is a modified Darlington stage (used as an amplifier rather than as an impedance matching device) consisting of the transistors 58 and 60. The Darlington stage feeds into three cascaded amplifier stages represented by the transistors 62, 64 and 66. Unity DC feedback is provided through line 68 to maintain the operating point of the entire amplifier substantially constant from about −40° C. to about +70° C.

In order to keep the amplifier gain independent of the transistor characteristics, both the modified Darlington stage and the amplifier stages are connected so that their gain is a function of the relative magnitudes of the resistances in the emitter-collector circuits, e.g. in the Darlington stage, the ratio of the resistors 70, 72. The three cascaded amplifier stages have a separate feedback circuit through feedback resistor 74 for even greater stability.

The frequency response characteristic of the equalizer is adjusted so as to pass essentially only the maximum energy frequency of 0.772 megacycles and its second harmonic. The latter is useful in subsequent circuits of the repeater (not shown) which provide the clock pulses for the generation of new signals for the next cable section. The third harmonic, however, is useless and interferes with clock pulse generation, and it is therefore eliminated by the LC network 76, 78. The low frequencies responsible for the prolonged tail of the pulse shown in FIG. 4 are eliminated by the RC network 80, 82; and the high frequency rolloff designed to reduce noise and crosstalk is accomplished by capacitors 84, 86.

The output of transistor 66 is coupled through coupling capacitor 88 to the output 18 loaded by the load resistor 90. The equalizer amplifier is so designed that when the variable LBO network is properly adjusted, the output at 18 has a wave shape such as that shown in FIG. 5 and a peak amplitude of 1 volt.

The equalized signal output 18 is directly connected, through line 100, to the input of the peak detector 20. The diode 102 eliminates the negative pulses from the equalized pulse train to provide a net positive input to the storage capacitor 104 through the noise-suppressing resistor 106. The capacitor 104 charges to the peak potential of the equalized pulses and applies this potential to the input of comparator 22.

The resistor 108 is so proportioned that the time constant of the RC circuit 104, 108 is long enough to prevent any appreciable decay of the charge on capacitor 104 during the time interval corresponding to three words, i.e. about 15$\mu$sec. in the standard PCM telephone system. (A minimum of one bit per word is transmitted at all times to keep the repeater's clock tank circuit oscillating even in the absence of any binary signal. Inasmuch as successive bits alternate in polarity, negative bits are eliminated by diode 102, and a bit may occur either at the beginning or the end of a word, the maximum possible time interval between positive bits is one bit short of three words.)

The comparator 22 contains a differential amplifier consisting of transistors 110, 112, and resistors 114, 116, 118. The base of transistor 110 constitutes the input of the comparator 22 and is maintained at the peak pulse potential by capacitor 104. The base of transistor 112 is maintained at a reference potential $V_R$ determined by the ratio of voltage divider resistors 120 and 122, 124. Diode 126, by controlling the drop across resistor 124, acts as a temperature compensator for diode 102.

The difference voltage developed by the differential amplifier between points 128 and 130 is used as the base-emitter bias for transistor 132. This transistor amplifies the difference voltage and references it to the negative DC supply (and hence to ground) by producing a drop across resistor 134 which varies in magnitude on either side of a balance value as the peak potential applied to the base of transistor 110 varies.

Diode 136 compensates for the base-emitter drop of transistor 132 and thereby makes the balance point independent of temperature variations in the circuit.

The balance signal produced by the drop across resistor 134 is applied by line 24 to the base of field-effect transistor 38 through the symmetry maintenance resistor 42. Inasmuch as the total loop gain in the servo loop 26–16–20–22–26 is dependent on the value of resistor 134, the pulse amplitude at which the system is in balance can be adjusted by varying resistor 134.

It will be noted that inasmuch as the FET 38 is a passive circuit element which draws no current from the control voltage line 24 nor from any power supply, the control of the LBO network characteristics is accomplished without any power consumption in the LBO network. In fact, the only power-consuming element in the control circuit is the comparator 22; and inasmuch as the comparator 22 need have only a voltage output, its power consumption can be kept at a relatively negligible level, as compared to the equalizer amplifier, by the choice of appropriate components. In this manner, the invention's purpose of providing automatic line build-out without significant power consumption is effectively fulfilled.

I claim:

1. An equalizing circuit for PCM telephone repeaters, comprising:
   a. a source of degraded PCM signals to be equalized;
   b. equalizing means for equalizing said signals;
   c. line build-out network means interposed between said signal source and said equalizing means, said network means including continuously variable attenuator means;

d. means for comparing a parameter of the equalized signal to a predetermined reference; and e. means for deriving a control signal from said comparison and applying the same to said attenuator means to vary the attenuation thereof.

2. The circuit of claim 1, in which said parameter is the amplitude, said attenuator is a voltage-variable resistive element, and said control signal is a DC control voltage.

3. The circuit of claim 2, in which said attenuator is a field-effect transistor whose source-drain circuit is interposed in said network and whose base is biased by said control voltage.

4. The circuit of claim 1, in which said variable attenuator is a passive element, and said network means consume no power other than signal power.

5. The circuit of claim 1, in which said comparing means include differentially connected comparator amplifier means for comparing the peak potential of the equalized signals to a reference potential, and difference amplifier means connected across the output of said comparator amplifier means for producing an amplified voltage output representative of the difference voltage across the output of said comparator amplifier means.